United States Patent [19]

Danielson

[11] Patent Number: 4,746,634

[45] Date of Patent: May 24, 1988

[54] SOLARIZATION-RESISTANT GLASS MICROSHEET

[75] Inventor: Paul S. Danielson, Corning, N.Y.

[73] Assignee: Corning Glass Works, Corning, N.Y.

[21] Appl. No.: 55,015

[22] Filed: May 28, 1987

[51] Int. Cl.$^4$ .......................... C03C 3/093; C03G 4/08
[52] U.S. Cl. ........................................ 501/67; 501/905
[58] Field of Search .................................. 501/67, 905

[56] References Cited

U.S. PATENT DOCUMENTS

| | | | |
|---|---|---|---|
| 2,958,604 | 11/1960 | George | 501/905 |
| 3,581,137 | 5/1971 | Arnott et al. | 501/905 |
| 3,951,671 | 4/1976 | Parry et al. | 501/67 |
| 4,305,757 | 12/1981 | Yamashita | 501/905 |

Primary Examiner—William R. Dixon, Jr.
Assistant Examiner—David M. Brunsman
Attorney, Agent, or Firm—Clinton S. Janes, Jr.

[57] ABSTRACT

This invention is directed to the production of glass microsheet which strongly resists solarization and exhibits an ultraviolet cutoff at 370 nm, the glass consisting essentially, expressed in terms of weight percent on the oxide basis, of

| | | | |
|---|---|---|---|
| $Na_2O$ | 6.75–7.75 | $B_2O_3$ | 8.75–10 |
| $K_2O$ | 6.25–7.0 | $SiO_2$ | 59–63 |
| $ZnO$ | 6.5–7.5 | $CeO_2$ | 4–6 |
| $Al_2O_3$ | 2–2.5 | $TiO_2$ | 1–3 |
| $Sb_2O_3$ | 0–0.5 | $CeO_2 + TiO_2$ | 6–8 |

2 Claims, No Drawings

SOLARIZATION-RESISTANT GLASS MICROSHEET

BACKGROUND OF THE INVENTION

Glass in thin sheet form, termed microsheet in the glass industry, i.e., glass sheeting having thickness dimensions customarily ranging between about 0.002"–0.025", has been produced for many years. For example, Corning Glass Works, Corning, N.Y. has marketed Code 0211 glass in thin sheet form for such diverse applications as cover slips for microscope slides used in laboratories, as thin and thick film substrates for use in magnetic film memory devices, liquid crystal displays, and electroluminescent devices, and in the form of larger pieces have been laminated to transparent plastic to provide windows of high durability and excellent resistance to abrasion and impacts. Such glass has long been prepared in individual sheet form of various dimensions and, more recently, as continuous sheeting which is rolled onto a spool.

One important technical application for microsheet consists of a protective covering for silicon solar cells utilized in the generation of electrical energy. The highly transparent sheeting is bonded to the solar cell by means of a transparent polymeric adhesive and protects the delicate cell from dirt, from mechanical abrasion and impacts, and from the effects of weathering, without significantly affecting the amount of solar energy which impinges upon the cell. Furthermore, because the microsheet is so thin [conventionally about 0.006" (0.152 mm) or less], very little weight is added by the protective glass sheet.

Manufacturers of solar cells have found that in certain energetically-hostile environments, e.g., satellites in earth orbit or elsewhere in space, the efficiency of the solar cell decreases with time because of the darkening of the protective glass, this darkening being generically termed solarization. High energy particles and photons cause damage in the glass at the atomic level, thereby decreasing the energy which reaches the silicon cell. A description of solarization and similar phenomena is provided in *Glass Structure by Spectroscopy*, J. Wong and C. A. Angell, Marcel Dekker, Inc., 1976, in chapter 6, section 6.5, "Irradiation—Induced Optical Phenomena."

One known remedy for solarization of glass comprises the inclusion of cerium, normally in the form of cerium oxide, in the glass composition. Wong and Angell explain a mechanism through which cerium may protect the glass from darkening.

The forming of glass microsheet is a very delicate and unforgiving process. Thus, the forming properties of the glass require extremely stringent control; foremost among those critical characteristics being the liquidus temperature of the glass or, more accurately, the maximum temperature of devitrification. Therefore, any significant increase in the tendency of the glass to develop crystals at its forming viscosity (in the vicinity of 100,000 poises) will lead to an unacceptable product, or even failure of the manufacturing process.

The optical transmission properties of the glass must be stringently controlled. Thus, the glass must be highly absorbing of radiation at wavelengths below about 350 nm so that the polymeric adhesive material is protected from degradation. On the other hand, the glass must be highly transparent to radiations having wavelengths longer than about 370 nm so that solar energy will be transmitted to the underlying solar cell. That latter requirement has been translated into a specification demanding a transmittance at a thickness of 0.006" greater than 50% at a wavelength of 370 nm. That feature effectively defines an "ultraviolet cutoff."

Corning Code 0211 glass has the following approximate composition, expressed in terms of weight percent on the oxide basis, of

| $SiO_2$ | 64.3 | $K_2O$ | 6.65 |
| $Al_2O_3$ | 2.25 | $ZnO$ | 7.0 |
| $B_2O_3$ | 9.3 | $TiO_2$ | 3.11 |
| $Na_2O$ | 7.15 | $Sb_2O_3$ | 0.25 | and exhibits the following physical properties

| Softening Point | 720° C. |
| Annealing Point | 550° C. |
| Strain Point | 508° C. |
| Coefficient of Thermal Expansion (0°–300° C.) | $74 \times 10^{-7}$/°C. |
| 24 Hour Liquidus | 890° C. |

In view of the desired thinness of the microsheet (no greater than about 0.006"), it was calculated that at least 4% by weight $CeO_2$ and, preferably, a minimum of 5% $CeO_2$ would be required to provide the necessary resistance to solarization. The simple addition of $CeO_2$ to the Code 0211 glass composition dramatically raised the liquidus temperature thereof and did not yield the necessary ultraviolet radiation transmittance at a wavelength of 370 nm.

Accordingly, the primary objective of the present invention was to develop glass compositions exhibiting melting and forming properties rendering them capable of being drawn into microsheet utilizing melting and forming apparatus and technology conventional in the drawing of microsheet, particularly an internal liquidus below 1050° C., preferably below 1000° C., and most preferably below 950° C., but which would demonstrate excellent resistance to solarization and manifest an effective ultraviolet cutoff at a wavelength of 370 nm.

SUMMARY OF THE INVENTION

Because of the need for the glass to exhibit melting and forming properties enabling it to be drawn into microsheet, the composition of Corning Code 0211 provided the base for the research. However, as was explained above, the simple addition of $CeO_2$ to the Code 0211 composition did not yield a glass demonstrating the required properties. Laboratory experimentation determined that, through the presence of $CeO_2$ and $TiO_2$ in carefully controlled concentrations, the required resistance to solarization, coupled with the necessary effective ultraviolet cutoff, can be attained. Hence, at least 4%, but not more than 6%, by weight $CeO_2$ and at least 1%, but not more than 3%, by weight $TiO_2$ are required, with the proviso that the sum of $CeO_2 + TiO_2$ ranges about 6–8% by weight.

Laboratory investigation has indicated that the levels of the constituents in the base $Na_2O$-$K_2O$-$ZnO$-$Al_2O_3$-$B_2O_3$-$SiO_2$ system can be varied within the narrow limits set out below without significantly affecting the required melting and forming characteristics of the glass.

| $Na_2O$ | 6.75–7.75 | $Al_2O_3$ | 2–2.5 |

-continued

| | | | |
|---|---|---|---|
| $K_2O$ | 6.25-7.0 | $B_2O_3$ | 8.75-10 |
| ZnO | 6.5-7.5 | $SiO_2$ | 59-63 |

Where desired, $Sb_2O_3$ may be included in amounts up to about 0.5% to perform its customary role as a fining agent.

DESCRIPTION OF PREFERRED EMBODIMENTS

Table I reports several glass compositions, expressed in terms of weight percent on the oxide basis, which are illustrative of the present invention. The actual batch ingredients for the glasses can comprise any materials, either oxides or other compounds, which, when melted together, will be converted into the desired oxide in the proper proportions. For example, borax may constitute a source of $Na_2O$ and $B_2O_3$.

In the laboratory work recorded below, glass batches totalling about one kilogram were compounded, tumble mixed together, and charged into platinum crucibles. After placing lids thereon, the crucibles were introduced into an electric furnace operating at about 1500° C. and the batches melted for about six hours with stirring. The melts were poured into steel molds to form glass slabs having dimensions of about 6"×6"×0.5" and those slabs were immediately transferred to an annealer operating at about 560° C.

TABLE I

| | 1 | 2 | 3 | 4 | 5 | 6 | 7 | 8 | 9 | 10 | 11 | 12 |
|---|---|---|---|---|---|---|---|---|---|---|---|---|
| $SiO_2$ | 59.3 | 59.9 | 60.4 | 60.9 | 61.4 | 61.9 | 60.65 | 62.4 | 61.4 | 63.4 | 62.4 | 59.4 |
| $Al_2O_3$ | 2.25 | 2.25 | 2.25 | 2.25 | 2.25 | 2.25 | 2.25 | 2.25 | 2.25 | 2.25 | 2.25 | 2.25 |
| $Na_2O$ | 7.15 | 7.15 | 7.15 | 7.15 | 7.15 | 7.15 | 7.15 | 7.15 | 7.15 | 7.15 | 7.15 | 7.15 |
| $K_2O$ | 6.65 | 6.65 | 6.65 | 6.65 | 6.65 | 6.65 | 6.65 | 6.65 | 6.65 | 6.65 | 6.65 | 6.65 |
| ZnO | 7.0 | 7.0 | 7.0 | 7.0 | 7.0 | 7.0 | 7.0 | 7.0 | 7.0 | 7.0 | 7.0 | 7.0 |
| $TiO_2$ | 3.1 | 2.5 | 2.0 | 1.5 | 1.0 | 0.5 | 2.0 | — | — | 1.0 | 2.0 | 2.0 |
| $CeO_2$ | 5.0 | 5.0 | 5.0 | 5.0 | 5.0 | 5.0 | 5.0 | 5.0 | 6.0 | 3.0 | 3.0 | 6.0 |
| $B_2O_3$ | 9.3 | 9.3 | 9.3 | 9.3 | 9.3 | 9.3 | 9.3 | 9.3 | 9.3 | 9.3 | 9.3 | 9.3 |
| $Sb_2O_3$ | 0.25 | 0.25 | 0.25 | 0.25 | 0.25 | 0.25 | — | 0.25 | 0.25 | 0.25 | 0.25 | 0.25 |

Table II records physical properties measured on the above glasses utilizing techniques conventional in the glass art. The softening point (S.P.), annealing point (A.P.), and strain point (St.P.) are reported in terms of °C., the coefficient of thermal expansion (Exp.) in terms of ×10$^{-7}$/°C., and the density (Den.) in terms of g/cm$^3$. Determinations of the internal liquidus (Liq.) were made in the conventional manner utilizing a platinum boat in a gradient temperature furnace.

Table II also lists absorption coefficients at a wavelength of 370 nm ($\beta_{370}$) as a function of $TiO_2$ level (at a constant 5% $CeO_2$ constant) calculated from spectra obtained on ground and polished samples of approximately 1 mm thickness. Several of those samples were further ground and polished to a thickness of about 0.5 mm and the absorption coefficients recalculated from spectra obtained therefrom. The latter values showed good agreement with those determined from the thicker specimens. Finally, Table II recites calculated transmission levels expected for microsheet of 0.006" thickness based upon the observed absorption ($T_{370}$). The results indicate that the $TiO_2$ content must be held below 3% in order to insure an acceptable ultraviolet cutoff.

In passing it should be noted that presence or absence of $Sb_2O_3$ has a negligible effect upon the properties demonstrated by the glass (Example 3 vs. Example 7).

Example 5 was deemed to constitute the most preferred composition based upon the overall melting and forming characteristics and the matrix of physical properties displayed thereby.

TABLE II

| | 1 | 2 | 3 | 4 | 5 | 6 | 7 | 8 | 9 | 10 | 11 | 12 |
|---|---|---|---|---|---|---|---|---|---|---|---|---|
| S.P. | 710 | 706 | 713 | 717 | 717 | 723 | 715 | 725 | 727 | 733 | 722 | 715 |
| A.P. | 552 | 549 | 549 | 557 | 558 | 553 | 558 | 557 | 562 | 558 | 557 | 558 |
| St.P. | 513 | 514 | 508 | 522 | 521 | 511 | 521 | 517 | 525 | 521 | 519 | 521 |
| Exp. | 75.9 | 76.7 | 75.4 | 75.1 | 75.5 | 75.3 | 76.2 | 75.6 | 75.1 | 73.5 | 74.5 | 75.6 |
| Den. | 2.63 | 2.63 | 2.63 | 2.61 | 2.61 | 2.61 | 2.62 | 2.63 | — | — | — | — |
| Liq. | 1079 | 1042 | 956 | 948 | 942 | — | — | 912 | 973 | 873 | 884 | 991 |
| $\beta_{370}$ | 1.8 | 1.50 | 1.28 | 1.0 | 0.79 | 0.52 | 1.30 | 0.28 | 0.357 | 0.397 | 0.655 | 1.3 |
| $T_{370}$ | 48.4% | 53.9% | 59% | 64.4% | 69.4% | 76.1% | 58% | 82.8% | 80.6% | 79.5% | 72.6% | 58% |

I claim:

1. A glass suitable for the fabrication of glass sheeting having a thickness ranging between about 0.002"–0.025" which strongly resists solarization and exhibits an ultraviolet radiation cutoff at 370 nm consisting essentially, expressed in terms of weight percent on the oxide basis, of:

| | | | |
|---|---|---|---|
| $Na_2O$ | 6.75-7.75 | $B_2O_3$ | 8.75-10 |
| $K_2O$ | 6.25-7.0 | $SiO_2$ | 59-63 |
| ZnO | 6.5-7.5 | $CeO_2$ | 4-6 |
| $Al_2O_3$ | 2-2.5 | $TiO_2$ | 1-3 |
| $Sb_2O_3$ | 0-0.5 | $CeO_2 + TiO_2$ | 6-8. |

2. A glass according to claim 1 having the approximate composition of:

| | | | |
|---|---|---|---|
| $Na_2O$ | 7.15 | $B_2O_3$ | 9.3 |
| $K_2O$ | 6.65 | $SiO_2$ | 61.4 |
| ZnO | 7.0 | $CeO_2$ | 5.0 |
| $Al_2O_3$ | 2.25 | $TiO_2$ | 1.0 |
| $Sb_2O_3$ | 0.25 | $CeO_2 + TiO_2$ | 6.0. |

* * * * *